Jan. 14, 1941.  J. A. COSTA  2,228,443
DEVICE FOR CLEANING COMBS
Filed May 15, 1939
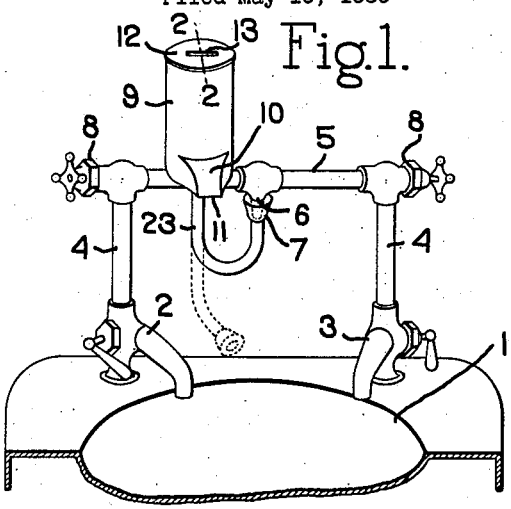
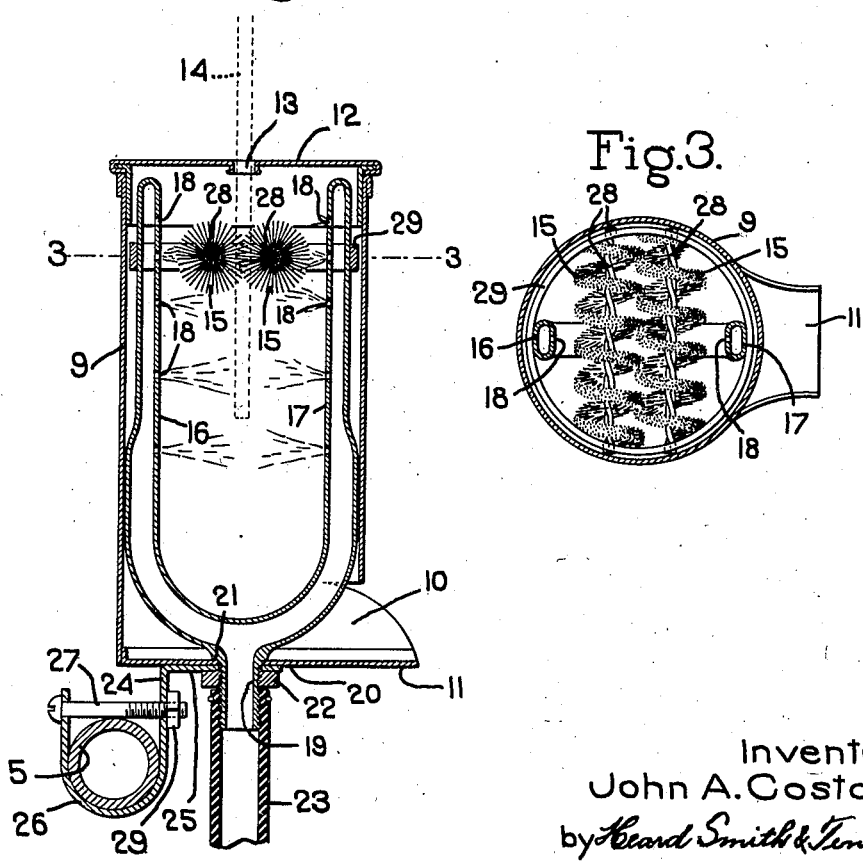
Inventor.
John A. Costa
by Heard Smith & Tennant
Attys.

Patented Jan. 14, 1941

2,228,443

UNITED STATES PATENT OFFICE 2,228,443

DEVICE FOR CLEANING COMBS

John A. Costa, Roslindale, Mass.

Application May 15, 1939, Serial No. 273,715

1 Claim. (Cl. 15—39)

This invention relates to a device for cleaning hair combs and other similar tonsorial implements, and it has for one of its objects to provide a novel comb-cleaning device which is constructed to clean the comb by the joint action of rotary brushes and a spray of water directed against the comb while the brushes are acting thereon.

My improved comb-cleaning device comprises a casing having an open top and a drain opening at its bottom, a cover for the casing having a slot through which the comb to be cleaned may be inserted, a pair of freely rotatable brushes within the casing to act on the comb as it is moved up and down in the slot, and means for spraying water against the comb while it is being acted on by the brushes. The brushes serve to discharge from between the teeth of the comb any dirt or other matter, and the spray washes such dirt or refuse matter from the comb and from the brushes, the dirty water being discharged through the drain opening of the casing.

I propose to so mount the casing that the water draining therefrom will flow into a washbowl or any other suitable receptacle.

In order to give an understanding of the invention I have illustrated in the drawing a selected embodiment thereof which will now be described after which the novel features will be pointed out in the appended claim.

In the drawing:

Fig. 1 is a perspective view partly in section illustrating my improvements as applied to the washbowl fixtures of a barber shop or beauty parlor;

Fig. 2 is an enlarged section on the line 2—2, Fig. 1;

Fig. 3 is a section on the line 3—3, Fig. 2.

In Fig. 1, I indicates a washbowl which is supplied with water from two faucets 2 and 3, one of which is a hot water faucet and the other of which is a cold water faucet. Each faucet is shown as having the pipe extension 4 rising therefrom and the two pipe extensions are connected by a pipe section 5 which is provided with a nipple 6 adapted to detachably receive a rubber pipe connection with which some tonsorial implement may be supplied with water. Each pipe extension 4 is connected to the pipe section 5 through a suitable valve 8 so that the implement or device which is attached to the nipple 6 may be supplied with either hot water or cold water or water of any desired temperature by properly manipulating the valves 8.

The construction thus far described is such as is commonly found in barbershops and forms no part of my present invention.

My improved comb-cleaning device comprises a casing 9 having an open top and also having a drain opening 10 in one side at its bottom, said casing preferably being provided with a discharge lip 11 over which the liquid draining from the casing through the opening 10 will flow.

The casing 9 is provided with a removable cover 12 having a slot 13 through which the comb 14 to be cleaned may be inserted.

Situated within the casing is a pair of freely rotatable spiral brushes 15, said brushes being so disposed that a comb 14 inserted through the slot 13 will pass between the brushes. When the comb has been introduced between the brushes, as shown in Fig. 2, an up-and-down movement of the comb will cause the brushes to rotate and thereby clean the comb in a well-known way by brushing dirt and other matter from between the teeth of the comb.

In my improvements I have provided means for spraying water on to the comb and the brushes while the comb is being cleaned. By this means, any dirt which is brushed out from between the teeth of the comb will be washed off from the brushes and from the comb and will be carried by the water out through the drain opening 10. While any appropriate spray device may be used, I propose to employ two vertically arranged spray pipes 16, 17 which are situated either side of the brushes 15 and each of which is provided with spray apertures 18 arranged to deliver water against the comb and brushes. These two spray pipes are shown as connected together at their lower ends and also connected to a nipple section 19 which extends through the bottom 20 of the casing. This nipple section is shown as being shouldered at 21 to rest against the bottom, and said nipple is clamped to the bottom 20 of the casing by means of a clamping nut 22 which is screw-threaded to the nipple. The portion of the nipple 19 which projects below the bottom 20 of the casing has a pipe connection 23 connected thereto by which water may be supplied to the spray pipes. While this pipe connection 23 may lead to any suitable source of water supply, I have herein shown a flexible pipe connection which is provided at its end with a rubber socket connection 7 adapted to be slipped over the nipple 6 of the pipe section 5.

The brushes 15 are shown as rotatably mounted in a brush-supporting ring 29 which encircles the spray pipes 16, 17, and is soldered or otherwise firmly secured thereto. Each brush has a wire core 28 and the ends of these cores are received in apertures formed in the supporting ring 29, thus providing for the free rotation of the brushes.

The casing 9 may be supported in any suitable way. One convenient way would be to mount it on the pipe section 5 in such a way that the water draining out of the drain opening 10 over the lip 11 will drain into the bowl 1, as shown in the drawing. For this purpose I have provided a supporting bracket 24 which has a horizontal portion 25 underlying the casing bottom 20 and clamped thereto by the clamping nut 22, said horizontal portion 25 having an opening through which the nipple 19 extends. This supporting bracket is also formed with the U-shaped pipe-engaging portion 26 which extends partially around the pipe 5 and the bracket is clamped to the pipe 5 by a clamping bolt 27 which extends through the two legs of the U-shaped portion 26 and has a nut 29 screw-threaded thereon.

In using the device, the comb 14 to be cleaned will be inserted through the slot 13 and introduced between the brushes 15. One or both of the valves 8 may then be opened so as to deliver to the spray pipes 16 and 17 water of the desired temperature. The comb 14 is then worked up and down between the brushes which will clean the dirt and refuse from between the teeth of the comb, and at the same time the water issuing from the spray apertures 18 will wash the dirt from both the comb and the brushes, the dirty water being discharged through the drain opening 10 and into the bowl 1.

Since the pipe connection 23 by which water is supplied to the spray pipes is detachably applied to the nipple 6, said pipe connection can be readily disconnected from the nipple whenever it is desired to attach to said nipple the pipe connection of some other tonsorial device. My improvements, therefore, do not require any change in the piping system as the supply pipe 23 therefor can be attached to the ordinary nipple with which the piping system of barbershops is usually provided.

I claim:

A comb-cleaning device comprising a casing having an open top and a drain opening in its bottom, a pair of vertically extending spray pipes within the casing, a brush-supporting ring carried by the spray pipes, a pair of freely rotatable brushes mounted on said ring to rotate about horizontal axes, a cover for the casing having a comb-receiving slot extending parallel to the brushes and directly over a point midway between the two axes of the brushes, and a pipe connection for supplying water to the spray pipes.

JOHN A. COSTA.